Figure 1:
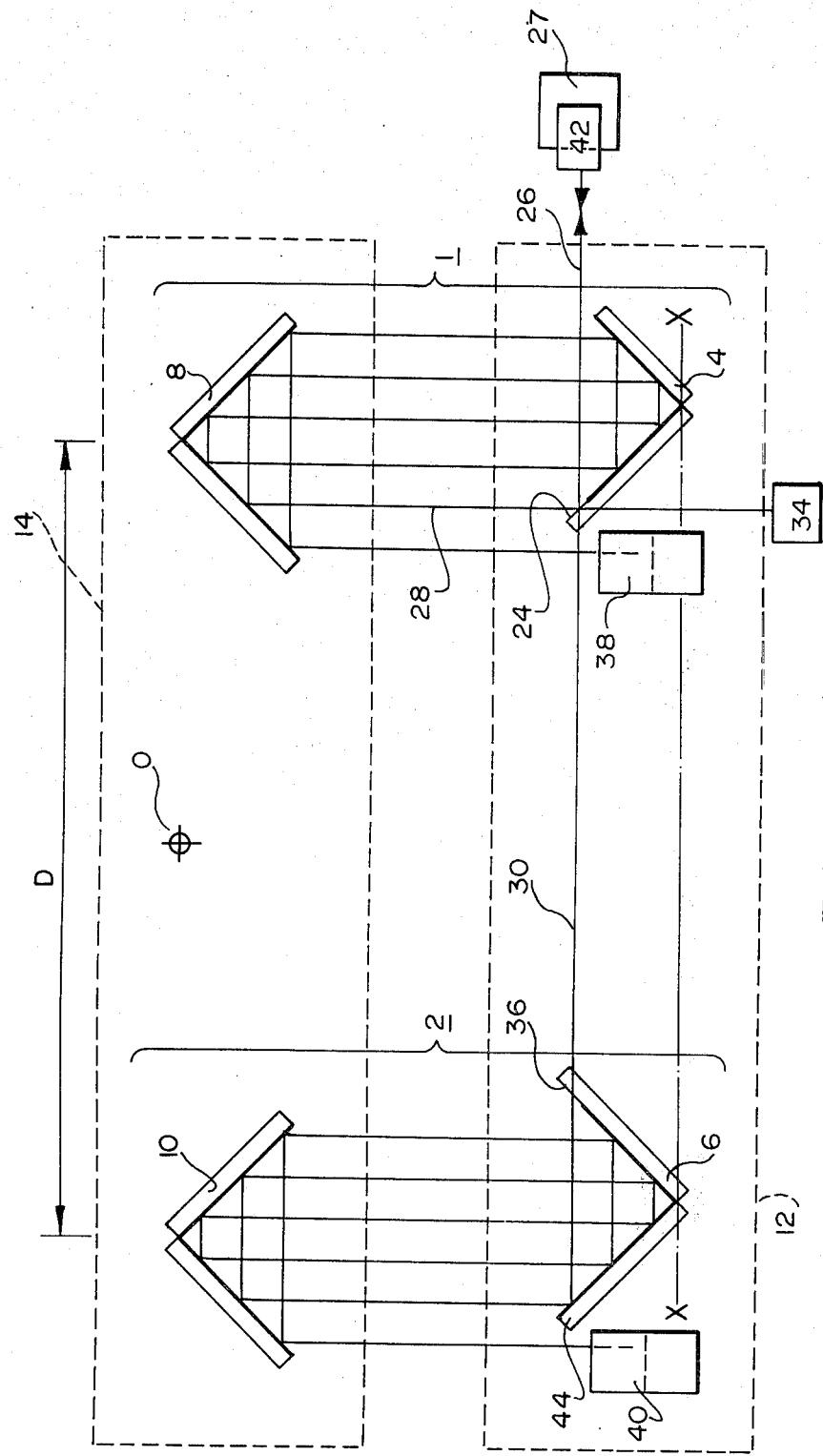

United States Patent [19]

Chapman

[11] 3,926,523

[45] Dec. 16, 1975

[54] OPTICAL SYSTEM FOR ANGLE MEASUREMENT BY INTERFEROMETRY

[75] Inventor: George D. Chapman, Ottawa, Canada

[73] Assignee: Canadian Patents and Development Limited, Ottawa, Canada

[22] Filed: Aug. 26, 1974

[21] Appl. No.: 500,364

[30] Foreign Application Priority Data
July 22, 1974 Canada.............................. 205272

[52] U.S. Cl................................. 356/110; 356/113
[51] Int. Cl.².......................................... G01B 9/02
[58] Field of Search................ 356/110, 106 R, 113

[56] References Cited
UNITED STATES PATENTS
3,471,239  10/1969  Woodson............................ 356/110
3,551,055  12/1970  Chitayat.............................. 356/110

Primary Examiner—Ronald J. Stern
Assistant Examiner—Conrad J. Clark
Attorney, Agent, or Firm—Francis W. Lemon

[57] ABSTRACT

An optical system for angle measurement by interferometry comprises four retroreflectors arranged in pairs as beam pathlength multipliers, with two adjacent ones of the retroreflectors rigidly mounted and the other adjacent ones mounted for rotation together about a common axis. A beam of electromagnetic energy, for example a laser beam, is directed towards a beam splitter by which means it is split into two secondary beams, one secondary beam being directed to pass back and forth between one pair of the retroreflectors while the other secondary beam is similarly directed by a beam folder to pass back and forth between the other pair of retroreflectors. Both reflected beams are redirected by retroreflectors along similar paths between their respective retroreflectors to the beam splitter where interference between the secondary beams occurs. The angular displacement of the movable retroreflectors is deduced from the distance between their ridges and the number of fringes generated at the beam splitter.

4 Claims, 3 Drawing Figures

OPTICAL SYSTEM FOR ANGLE MEASUREMENT BY INTERFEROMETRY

This invention relates to an optical system for angle measurement by interferometry.

There is a need to generate and/or measure angles with high precision and accuracy, to calibrate or verify existing angle standards, and to provide a consistent method to relate angular measurements to length standards.

Angle measurements and reproduction of angular settings are currently carried out in a variety of ways:

1. In the work-shop, angle blocks, sine bars, and indexing or dividing heads are most often used to generate known angles. Angle blocks are calibrated by comparative and subdivision techniques, using Fizeau interferometry and autocollimation methods. They may be wrung together to generate a wide range of discrete angles. The sine bar directly relates length measurement to angular measurement over a limited range.

2. Divided circles, such as rotary tables, are used to position workpieces and to generate angles. These must be calibrated and operate over a range of 360° with accuracies up to ±1 second of arc.

3. Indexing heads generate angles in discreet, precise steps. The best of these that is commercially available at the present time has a claimed accuracy of ±0.25 seconds of arc.

4. Many devices are employed in setting to a predetermined reference position. An autocollimator will detect the return of a rotated object to its original position to within a few milliseconds of arc, but is incapable of measuring a swept angle. The same is true of the many commercially available electro-mechanical transducers.

5. Interferometric devices are used in angle calibration. These include the standard Fizeau interferometer used to calibrate angle blocks.

Broadly speaking, all of the currently used methods suffer from one or more of the following limitations:

1. Discrete angles are generated, and interpolation may be necessary. (Angle blocks, sine bar, indexing heads).

2. A reproducible position may be obtained, but no swept angle can be measured. (Autocollimators, electro-mechanical transducers).

3. Methods of inherently high precision, e.g. existing angle-measuring interferometers, may yet be inaccurate or limited in range.

4. Devices which are at once precise and accurate, such as the indexing head, cannot be directly calibrated by a quick and simply made comparison with a more accurate reference standard since no such device presently exists to provide the accurate reference standard.

It is an object of the present invention to provide an optical system for angle measurement by interferometery where:

1. Arbitrary angles are generated and so interpolation is not necessary.

2. A swept angle can be measured.

3. A high degree of accuracy is obtainable.

4. Devices, such as the indexing head, can be directly calibrated by a quick and simply made comparison with a more accurate reference standard.

According to the present invention there is provided an optical system for angle measurement by interferometery comprising:

a. two, similar beam pathlength multipliers, each consisting of a fixed retroreflector and a movable retroreflector in the reflecting path of the corresponding fixed retroreflector to form the beam pathlength multiplier therewith, b. fixed mounting means mounting both of the fixed retroreflectors with their inversion planes in a common plane which is normal to beams to be reflected back and forth between each fixed retroreflector and the corresponding movable retroreflector, c. rotatable mounting means mounting both of the movable retroreflectors for rotation together about a single axis at right angles to the said beams, and with the movable retroreflectors at a predetermined distance apart, d. a beam splitter adjacent a first one of the fixed retroreflectors, for splitting a primary beam of electromagnetic energy, from a source thereof, into two secondary beams, and directing one secondary beam into the reflecting path of the beam pathlength multiplier consisting of the said first fixed retroreflector and the corresponding moveable retroreflector, and the other secondary beam in front of the reflecting faces of a second one of the fixed retroreflectors, e. a beam folder adjacent the said second, fixed retroreflector for reflecting the said other secondary beam to the beam pathlength multiplier, consisting of the said second, fixed retroreflector and the corresponding movable retroreflector thereto, f. two retroreflectors each adjacent one of the fixed retroreflectors, and each for reflecting one of the said secondary beams back along paths between the adjacent, fixed retroreflector and the corresponding movable retroreflector towards the beam splitter, where interference between the secondary beams will occur, forming patterns of fringes, whereby g. when a primary beam of electromagnetic energy is directed from a source thereof to the beam splitter, angular displacements of the rotatable mounting means about said axis of rotation can be deduced from the predetermined distance that the ridges of the movable retroreflectors are apart and a count of the number of fringes generated at the beam splitter by rotation of the rotatable mounting means.

Figure 2:
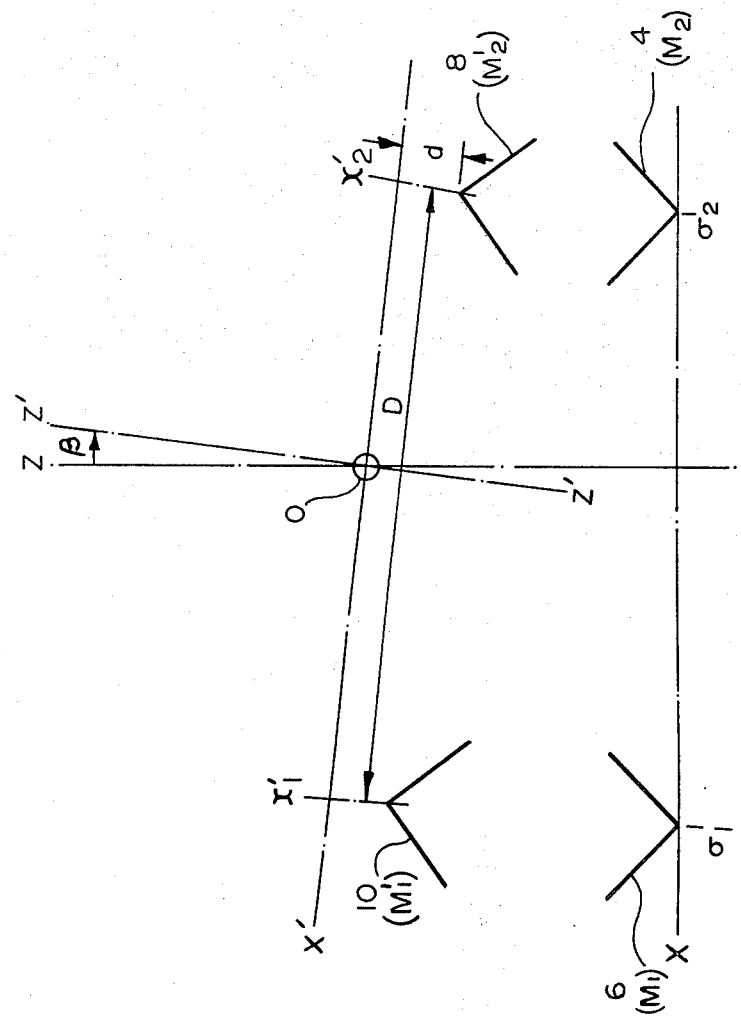
Figure 3:
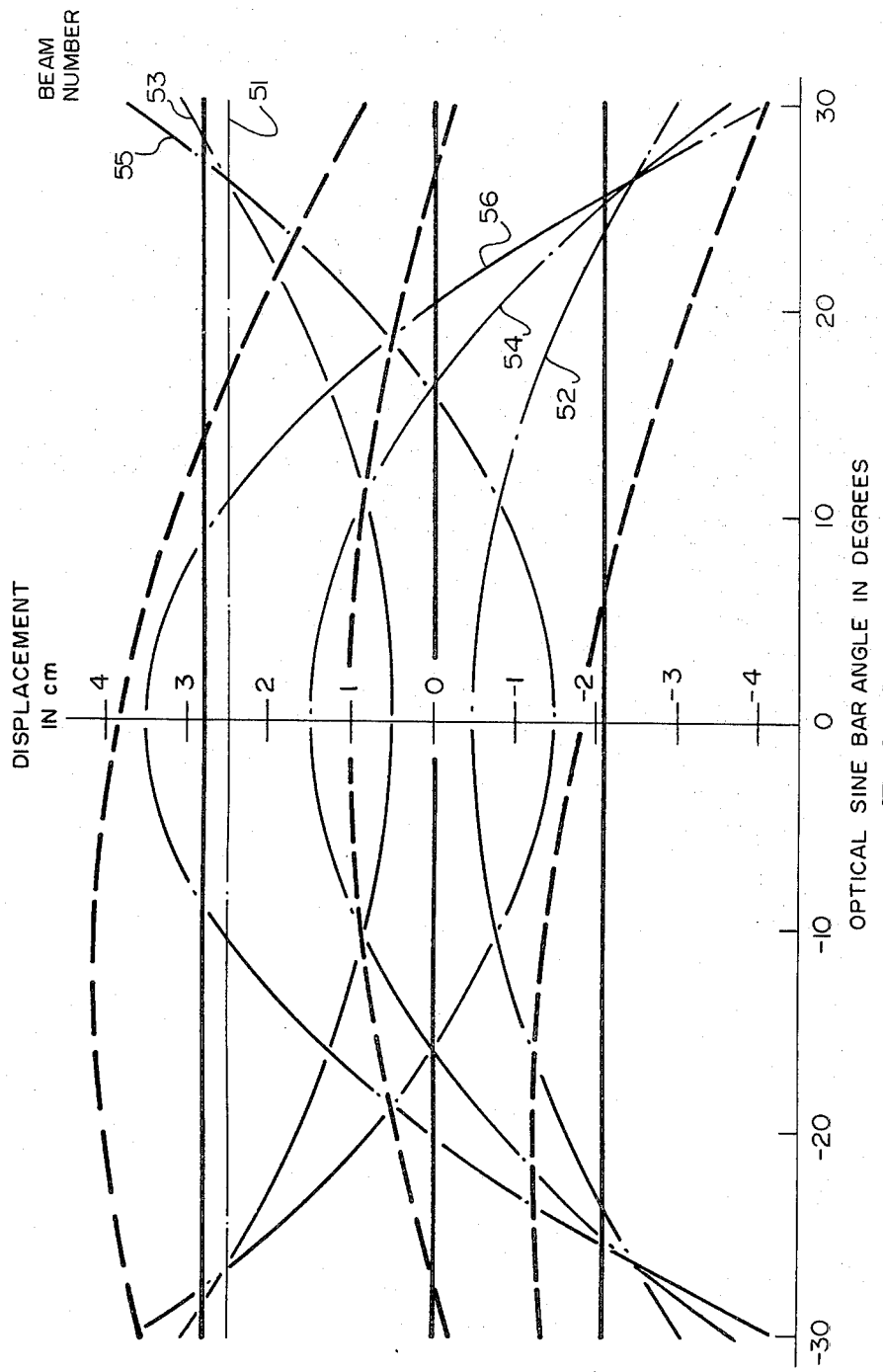

In the accompanying drawings which illustrate, by way of example, an embodiment of the present invention, FIG. 1 is a schematic diagram of an optical system for angle measurement by interferometery, FIG. 2 is a schematic diagram for use in describing the design criteria and calculations for the apparatus shown in FIG. 1, and FIG. 3 is a graphical display of the behaviour of a beam pathlength multiplier, of the optical system shown in FIG. 1, as a function of the rotational movement of the movable, retroreflectors of that optical system.

In FIG. 1 there is shown an optical system for angle measurement by interferometery, using a folded Michelson type interferometer, comprising:

a. two, similar beam pathlength multipliers 1 and 2 each consisting of a fixed dihedral retroreflector 4 and 6 respectively, and a movable dihedral retroreflector 8 and 10 respectively, in the reflecting path of the corresponding fixed, retroreflector 4 and 6 to form the beam pathlength multiplier 1 or 2 therewith. As will be described later, corresponding portions of the beam paths of both beam pathlength multipliers 1 or 2 are parallel and the beams travel in the same directions along the corresponding portions, b. fixed mounting means 12 (shown dashed) mounting both of the fixed retroreflectors 4 and 6 with their inversion planes in a common plane XX (shown chain-dotted) which is normal to the beams to be reflected back and forth between each fixed, retroreflector 4 and 6 and the corresponding movable retroreflector 8 and 10 respectively, c. rotatable mounting means 14 (shown dashed) mounting both of the movable retroreflectors 8 and 10 for rotation together, in this embodiment, about an axis 0 parallel to all of the reflecting surfaces of the fixed, retroreflectors 4 and 6 and the movable retroreflectors 8 and 10 respectively, and with the ridges of the movable retroreflectors 8 and 10 at a predetermined distance 'D' apart, d. a beam splitter 24 adjacent a first one, 4, of the fixed retroreflectors, for splitting a primary beam of electromagnetic energy, in this embodiment a laser beam 26 from a source 27, into two secondary beams 28 and 30, and directing the secondary beam 28 into the reflecting path of the beam pathlength multiplier 1 containing the first fixed retroreflector 4, and the other secondary beam 30 in front of a second one, 6, of the fixed retroreflectors, e. a beam folder 44 adjacent the second, fixed retroreflector 6 for reflecting the said other secondary beam 30 to the beam pathlength multiplier 2 consisting of the second, fixed retroreflector 6 and the corresponding movable, retroreflector 10 thereto, f. two retroreflectors 38 and 40 each adjacent one of the fixed retroreflectors, that is adjacent fixed, retroreflectors 4 and 6 respectively, and each for reflecting one of the secondary beams, that is secondary beams 28 and 30 respectively, back along the paths between the adjacent fixed retroreflector 4 and 6 respectively and the corresponding movable retroreflector 8 and 10 respectively towards the beam splitter 24, where interference between the secondary beams 28 and 30 will occur, forming patterns of fringes, whereby, as will be described later, g. when a primary beam of electromagnetic energy, that is laser beam 26, is directed from the source 27 to the beam splitter 24, angular displacements of the rotatable mounting means 14 about the axis of rotation O can be deduced from the predetermined distance 'D' that the ridges of the movable, retroreflectors 8 and 10 are apart and a count of the number of fringes generated at the beam splitter 24 by rotation of the rotatable mounting means 14. In this embodiment the number of fringes is counted in a reversible manner by light detectors 34 and 42.

In this embodiment a refraction compensator 36 is provided adjacent the second fixed retroreflector 6 for nullifying refraction of the secondary beam 30 by the beam splitter 24.

In operation the fixed, retroreflectors 4 and 6 are rigidly mounted as shown by the fixed mounting means 12. The movable retroreflectors 8 and 10 are mounted by means of the rotatable mounting means 14 on, for example, an indexing head (not shown) to be calibrated for rotational movement therewith about the axis O and the movable retroreflectors 8 and 10 equally spaced from the fixed, retroreflectors 4 and 6 when the indexing head scale is set at zero degrees angular displacement.

The indexing head is then rotated to a first setting where the scale thereof indicates a particular angular displacement while the source 27 is used to pass the primary beam 26 beneath the fringe detector 42 to the beam splitter 24 where, as stated above the primary beam 26 is split into the two secondary beams 28 and 30.

The secondary beam 28 is reflected back and forth between the movable retroreflector 8 and the first, fixed retroreflector 4, along the path shown and to the retroreflector 38 where it is reflected upwards into the plane of the light detector 42 back and forth a second time between the movable retroreflector 8 and the first, fixed retroreflector 4, and then to the beam splitter 24.

The other secondary beam is refracted as it passes through the beam splitter 24 and is refracted back to its normal path by the refraction compensator 36. The secondary beam 30 is then reflected by the beam folder 44, which is a beam path folding reflecting surface of the second, fixed retroreflector 6, towards the movable retroreflector 10 to be reflected back and forth between the movable retroreflector 10 and the second, fixed retroreflector 6 along the path shown and then towards the retroreflector 40. The secondary beam received by the retroreflector 40 is reflected upwards into the plane of the fringe detector 42 and back and forth a second time between the movable retroreflector 10 and the second, fixed retroreflector 6 and then through the refraction compensator 36, through the substrate of the beam splitter 24 to interfere with the above mentioned beam 28 to form a pattern of fringes detected by light detectors 34 and 42. The readouts of the light detectors 34 and 42 are noted and the process repeated with the indexing head at different settings.

The design criteria of the apparatus shown in FIG. 1 and calculation of the angular displacements of the movable retroreflectors 8 and 10, relative to the fixed retroreflectors 4 and 6, from the readouts of the light detectors 34 and 42 will now be described with reference to FIG. 2.

The movable retroreflectors 8 and 10 are mounted on the rotatable mounting means 14 (FIGS. 1) with a ridge spacing D to form what may be considered as an optical sine bar. The fixed retroreflectors 4 and 6 are immovably mounted on the fixed mounting means 12 (FIG. 1) to form a spaced-fixed set and are so placed as to form similar beam pathlength multipliers with the movable retroreflectors 8 and 10 respectively.

With the fixed set of retroreflectors 4 and 6 there is associated a coordinate frame F $(x, y, z)$ and with the movable retroreflectors 8 and 10 there is associated a coordinate frame F' $(x', y', z')$ as shown. The rotating frame F' is formed by the rotatable mounting means 14 (FIG. 1) and the movable retroreflectors 8 and 10, and the X' axis is parallel to an imaginary line joining the ridges of the movable retroreflectors 8 and 10, and is a perpendicular distance $d$ therefrom.

The fixed space frame, F, is formed by the fixed mounting means 12 (FIG. 1) and the fixed retroreflectors 4 and 6, and is arranged so that the X axis passes through the ridges of the fixed retroreflectors 4 and 6 and the Z axis passes through the centre of rotation O. The Y and Y' axis are made to be parallel.

In order to simplify the following equations, the fixed retroreflectors 4 and 6 are referred to as $M_2$ and $M_1$ respectively, and the movable retroreflectors are referred to as reflectors $M_2'$ and $M_1'$ respectively.

The reflectors $M_q'$ (q = 1 or 2) are located by vectors $$\bar{u}_q' = \begin{bmatrix} x_q' \\ 0 \\ z_q' \end{bmatrix} \quad (1)$$

while reflectors $M_q$ (q = 1 or 2) are located at positions $\sigma_q$ on the X axis. The following equations also hold:

$$\left. \begin{array}{l} z_1' = z_2' = d \\ x_1' - x_2' = D \end{array} \right\} \quad (2)$$

In the following, equations cited such as, for example, (1–5) refer to equations appearing in Applied Optics, Volume 13, pages 679 to 683, Mar. 1974, and the second numeral, such as the 5 of (1–5) refers to the equation designated by that numeral in that publication. The vector $$\bar{u}_0 = \begin{bmatrix} 0 \\ 0 \\ z_0 \end{bmatrix} \quad (3)$$

locates the origin of the frame F' in the frame F. If F' makes an angle $\alpha$ with F, the Hermitian rotation operator defined by equation (1–3) becomes, in the ZX plane:

$$\underline{L}(\alpha) = \begin{bmatrix} \cos\alpha & 0 & -\sin\alpha \\ 0 & 1 & 0 \\ +\sin\alpha & 0 & \cos\alpha \end{bmatrix} \quad (4)$$

where $\alpha$ is positive when anticlockwise rotation occurs about the positive Y' axis. Transforming equation (1) to F coordinates, as in equation (1–5), $$\bar{u}_q(\alpha) = \underline{L}^{-1}(\alpha) \bar{u}_q' + \bar{u}_0 \quad (5)$$

If the angle $\alpha$ increases or decreases to $\beta$, then the change in the position of the $q^{th}$ reflector ($M_1'$ or $M_2'$) may be found with the aid of equation (5):

$$\Delta \bar{u}_q (\alpha,\beta) = \bar{u}_q(\beta) - \bar{u}_q(\alpha) = [L^{-1}(\beta) - L^{-1}(\alpha)] \bar{u}_q' \quad (6)$$

or, in matrix form:

$$\Delta \bar{u}_q(\alpha,\beta) = \begin{bmatrix} [\cos\beta-\cos\alpha] & 0 & [\sin\beta-\sin\beta] \\ 0 & 0 & 0 \\ [\sin\beta-\sin\alpha] & 0 & [\cos\beta-\cos\alpha] \end{bmatrix} \bar{u}_q' \quad (7)$$

The primary interest is in the measurement of the changes in the x and z components of the positions of the reflectors ($M_1'$ and $M_2'$) as functions of $\alpha$ and $\beta$. Using equation (2), the components of equation (7) are:

$$\Delta x_q(\alpha,\beta) = [\cos\beta-\cos\alpha]x_q' + [\sin\beta-\sin\alpha]d \quad (8)$$
$$\Delta z_q(\alpha,\beta) = -[\sin\beta-\sin\alpha]x_q' + [\cos\beta-\cos\alpha]d. \quad (9)$$

In order to measure the angle $\beta$, the quantity to be measured interferometrically, K, is obtained from equation (9), with the aid of equation (2), $$K = |\Delta z_1(\alpha,\beta) - \Delta z_2(\alpha,\beta)| = D[\sin\beta - \sin\alpha], \quad (10)$$

while the lateral shift of $M_1'$ or $M_2'$ is given directly by equation (8).

If the ridges of all reflectors ($M_1$, $M_2$, $M_1'$ and $M_2'$) in the interferometer optical system are parallel to the Y and Y' axes, then the multiply reflected beam pattern within either beam pathlength multiplier (BPM) 1 or 2 (FIG. 1) may be described in the reference frame of the static member, whose Y axis lies along the ridge of the static reflector and whose Z axis is parallel to the reflected beams. This orthonormal coordinate system will be referred to as the S frame, following the designation given thereto in the previously mentioned Applied Optics, Volume 13, pages 679 to 683, Mar. 1974.

If $n$ is an odd positive integer and $p$ is any positive integer, then the $x$ coordinate of the $n+2p^{th}$ reflected beam travelling away from the static reflector is specified by equation (1-31):

$$x_{n+2p} = x_n - 2px_0. \quad (11)$$

$x_0$ is the lateral separation of the ridges of the reflectors composing the BPM.

In the interferometric optical system described above, it is clear that $x_0$ in equation (11) may no longer be regarded as a constant, but must be replaced by an angle-dependent variable. The $x$ component of the position vector of reflector $M_q'$ is, from equation (5), $$x_q(\beta) = x_q' \cos\beta + z_q' \sin\beta. \quad (12)$$

The ridge separation $x_{oq}(\beta)$ of the $q^{th}$ BPM, setting $z_q' = d$, is then $$x_{oq}(\beta) = x_q' \cos\beta + d \sin\beta - \sigma_q. \quad (13)$$

$x_{oq}(\beta)$ replaces $x_0$ in equation (11) and gives the reflector ridge separation based on measurements made in the F and F' coordinate frames.

Since interference between the exit beams from the two BPMs take place in the F frame, it is necessary to transform the $x$ components of the beam-location vectors given by equation (11) into the F frame. The transformation is a simple Galilean type, $$x_q^F = x_q^S + \sigma_q. \quad (14)$$

where the superscripts denote the relevant coordinate frames and the subscript, $q$, denotes the BPM being considered. This type of coordinate transformation leaves equation (11) unchanged in form if all of its components are specified in the F frame. Therefore substituting $x_{oq}(\beta)$ for $x_0$ in equation (11) we have, for either BPM 1 or 2 (FIG. 1) in the frame F:

$$x_{n+2p} = x_n - 2p (x' \cos\beta + d \sin\beta - \sigma). \quad (15)$$

In order that the exit beams from the two BPMs 1 and 2 (FIG. 1) can be made to interfere to produce fringes, their positions in the inversion plane of the static array are required to be mirror images in the YZ plane of F, i.e. that $x_1 = -x_2$ for any value of p. Using equation (15), this implies that $$\left. \begin{array}{l} d \equiv 0 \\ (x_1)_n = -(x_2)_n \\ x_1' = -x_2' \\ \sigma_1 = -\sigma_2 \end{array} \right\} \quad (16)$$

The equations (16) indicate that both static and movable assemblies must be symmetric about the YZ plane, imposing rather stringent design restrictions. They represent the conditions which must exist in order that the emergent beams from each of the BPMs maintain spatial correlation as the movable set of reflectors is rotated through its operational range. Slight misalignment will result in the appearance of "shear" fringes in the output from the interferometer. For example, an angular misalignment of only 1 minute of arc will result in two shear fringes appearing across a beam width of 4 mm.

Virtually all of the above restrictions are lifted by employing a known technique wherein the exit beam from each BPM 1 and 2 (FIG. 1) is reflected back through the BPM for a second pass through the system. The beam reemerges propagating parallel to the incident beam from the laser. This double traversal counteracts any tendency of the exit beam to "walk" with respect to the incident beam, ensuring that interference is maintained regardless of translation of the reflectors of the movable set.

The lifting of the restriction imposed by the fourth of equations (16) allows the beam splitter 24 (FIG. 1) to be incorporated as an integral part of the beam-pathlength multiplier 1 (FIG. 1), and the beam path folding reflecting surface 44 of the fixed, retroreflector to act as a beam-folding mirror. The two retroreflectors 38 and 40, used to return the secondary beams 28 and 30 to the light detector 42, accommodate the incident-exit beam spacing of the fringe detector system.

With the rotatable mounting means 14 mounting both of the movable retroreflectors for rotation together about the axis 0 parallel to all of the reflecting surfaces of the fixed retroreflectors 4 and 6, and the movable retroreflectors 8 and 10, there is no tendency of the secondary beams 28 and 30, when passing towards the light detectors, to wander therefrom or from each other.

In this embodiment the fixed, retroreflectors 4 and 6, and the movable retroreflectors were each in the form of a roof reflector. The mirrors composing movable retroreflectors were 4.0 cm × 2.5 cm × 0.4 cm and were made from aluminized fused silica polished flat to $\lambda/10$. The large mirrors of the fixed, retroreflectors, that is the mirrors containing the beam splitter 24 and beam path folding reflecting surface 44, are of the same dimensions as the mirrors of the movable retroreflectors, while the dimensions of the remaining smaller mirrors were 3.0 cm × 2.5 cm × 0.4 cm.

The outer 1.0 cm of the larger mirror of the fixed, retroreflector 4 is half aluminized to form the beam splitter 24, while the outer 1.0 cm of the mirror, of the fixed retroreflector 6, containing the refraction compensator 36 is left transparent to form the refraction compensator 36.

It will be apparent that the use of roof reflectors for the fixed retroreflectors 4 and 6 allows the beam and the beam path folding reflecting surface 44 to be integral with the fixed retroreflector 6, greatly simplifying alignment of the optical system in the interferometer and insertion of the laser beam into the optical system. These advantages would not be obtained using cube corners for the fixed retroreflectors and even though these would minimize any pitching effect, a more complex reflected beam pattern would result in four distinct planes and the measurement of the length D would be complicated.

The rotatable mounting means was in the form of a ground bar of cold rolled steel 25.0 cm × 6.5 cm × 1.3 cm, and the movable retroreflectors 8 and 10 were mounted thereon in invar mounts with their ridges set at a nominal separation of about 19.0 cm.

The fixed mounting means 12 comprised pitch-roll plates having the fixed retroreflectors 4 and 6 mounted thereon in invar mountings, with the pitch-roll plates mounted on steel plates which could be translated along a ground way of a base plate of cold roll steel 32.8 cm × 6.8 cm × 1.3 cm, allowing $X_{oq}{}^{(\beta)}$ to be independently set for each of the beam pathlength multipliers 1 and 2.

The two retroreflectors 38 and 40 were small roof reflectors in the form of open prisms of fused silica mounted in holders fixed to the pitch-roll plates of the fixed mounting means 12. The ridges of the two retroreflectors 38 and 40 were at right angles to the ridges of the fixed retroreflectors 4 and 6 and the movable retroreflectors 8 and 10, and the holders allowed vertical translation of the two retroreflectors 38 and 40 relative to the plane of the reflected beam paths, as well as rotation of ±5° about their vertical axis.

In order to align the optical system, beam pathlength multipliers 1 and 2 were adjusted with the aid of an autocollimator, so that their component mirrors form a right angle and the normals to their surface lie in the same plane.

The fixed retroreflectors 4 and 6 were mounted on their pitch-roll plates, which in turn were affixed to the steel plates. In this initial investigation the movable mounting means 14 was securely clampled to a precision rotary table installed on a cast iron surface plate. The assembly on the fixed mounting means 12 was mounted on the surface plate at the correct height with respect to the assembly of the rotatable mounting means 14 and 30 cm from it. ($z_0$ of equation (3).

With the assembly on the fixed mounting means 12 displaced, the collimated beam from a stabilized single mode He/Ne laser was rendered horizontal to within two minutes of arc and at the correct height with respect to the assembly on the fixed mounting means 12 by means of a cathetometer.

An optical square was placed between the fixed, corner retroreflectors 4 and 6 which were then positioned to accept the beam from the laser. The beam reflected through a right angle by the optical square was adjusted with the aid of the cathetometer to lie in the horizontal plane containing the initial beam from the laser. Subsequently, all measurements were made with reference to this datum plane.

The beam reflected at right angles to the initial laser beam by the beam splitter 24 was made parallel to the beam reflected by the optical square in the datum plane. By using a cube corner to reflect this beam back to the other mirror of fixed retroreflector 4, that is the mirror not containing beam splitter 24, its ridge was set normal to the datum plane.

Removing the optical square, and using the beam from fixed retroreflector 4 as a reference, the ridge of fixed retroreflector 6 was rendered perpendicular to the datum plane by the method outlined above.

After the adjustment of the assembly on the fixed mounting means 12, the assembly on the rotatable mounting means 14 was placed roughly in position. By reflecting the incident beam from the fixed retroreflector 4 from first one, then the other of the two mirrors of the movable retroreflector 8, the ridge of the movable retroreflector 8 was adjusted perpendicular to the datum plane. The process was repeated for the movable retroreflector 10.

Finally, the fixed retroreflectors 4 and 6 were translated so that the beam pattern depicted in FIG. 1 was attained, the two retroreflectors 38 and 40 were adjusted so that the exit beam from each beam pathlength multiplier 1 and 2 was reflected back through the interferometer. Fine adjustments of the two retroreflectors 38 and 40 were made with visual reference to the fringe patterns produced in the directions of the beams radiating towards the positions of the light detectors 34 and 42.

Photodiode detectors were placed so as to intercept the fringe patterns at the positions of the light detectors 34 and 42 in such a way as to permit reversible counting of the fringes generated with the rotation of the rotatable mounting means 14. The output of each photodiode, suitably amplified and shaped, was fed into a reversible counter.

The most critical dimension in the optical system is the distance D between the ridge lines of the movable retroreflectors 8 and 10. These ridge or inversion lines do not exist physically, and so the distance D cannot be directly measured. Two methods have been employed to determine this critical dimension; the simplest and most reliable of the two is described below.

Two fused silica fiducial blocks, the ends of which had been shaped and polished to a right angle were inserted under a small, constant pressure into the apecies of the movable retroreflectors 8 and 10 mounted on the movable mounting means 14. Good surface contact was assured by the appearance of interference fringes in the thin film of air between the reference faces of the blocks and the aluminized surfaces of the movable retroreflectors 8 and 10.

Small shell fractures at the points of the blocks provided excellent sighting points for a microscope mounted on a coordinate measuring machine. A laser ranging interferometer was used to measure the separation of the sighting points of the microscope when the assembly on the movable mounting means 14 was displaced in its field of view. Care was taken to interchange the two blocks an even number of times during many repetitions of the measurement of D, to minimize systematic errors.

D was determined 94 times for a prototype, the fiducial blocks being interchanged eight times over the four day duration of the measurements. As a result, D = 19.02592 ± 0.00022 cm at 20°C, where the uncertainty is three times the standard deviation of the mean. This uncertainty is the largest encountered in the angular determinations.

The design of an optical system according to the present invention involves the selection of the apertures of the retroreflectors 4, 6, 8 and 10 and the relative spacing of their ridges over a range of angles. Both of these parameters affect the range of the optical system.

Equation (12) describes the positions of the ridges of the retroreflectors 8 and 10 as a function of the angle measured by the optical system, and may also be used to locate any other point on them, such as their edges, by inserting appropriate values for $x_q'$ and $z_q'$. Equation (15) defines the position of all of the odd-numbered beams in the beam pathlength multipliers 1 and 2 (those propagating away from the static reflector), with respect to one arbitrary beam. The applicant has found that if $j$ is an even positive integer, then the position of the $j^{th}$ beam is simply the mirror image about the ridge line of the fixed retroreflectors 6 or 4 of the $j+1^{th}$ beam.

The equations developed so far may now be used to analyze the performance of either beam pathlength multiplier 1 or 2 and the interferometer as a whole. As an example, the behaviour of the beam pathlength multiplier 2 will be considered, using the dimensions of the embodiment described above. For convenience the origin of coordinates will be taken as that of the S frame at the location of the ridge of fixed retroreflector 6.

If the linear aperture of movable retroreflector 10 is 2a, the position of its ridge relative to that of fixed, retroreflector 6 is given directly by equation (13), while the positions of the edges of their reflective surfaces will be given by $$x_r = x_{01}(\beta) \pm a(\cos\beta \mp \sin\beta). \qquad (17)$$

The reflected beam positions are specified by equation (15); if $x_n$ is specified in S coordinates, so will be any beam position $x_n + 2p$.

The relevant dimensions of the embodiment described above, in centimeters, were: $x_1' = 9.55$, $a = 2.83$, $x_1 = 2.5$, $\sigma_1 = 8.55$. $n$ is taken equal to 1, and $p$ ranges from 0 to 2. When these values are used in conjunction with equations (13), (17) and (15), the dynamic behaviour of the beam pathlength multiplier 2 may be analyzed graphically, as shown in FIG. 3 where the linear displacement of the movable retroreflector is plotted against the rotation of the movable set of retroreflectors 8 and 10, and the loci of the reflected beams are plotted against the same independent variable.

In FIG. 3:

locates the positions of the ridge and mirror edges of the fixed retroreflector 6, locates the positions of the ridge and mirror edges of the moveable retroreflector 10, and indicates the beam positions.

The plotted beam positions in FIG. 3 are the loci of the centres of the beams and the onset of the interception of the beams by the mirror edges of fixed retroreflector 6 and movable retroreflector 10 must take into account the beam diameters. The ridges of the fixed retroreflector 6 and the movable retroreflector 10 are also treated as perfect, which is not the case in practice. In this embodiment a 4 mm gap exists at the ridge positions.

The range limit is effectively set at ±3° by the approach of the beams of graphs 53 and 54 to the ridge gap of the movable retroreflector 10. Further restrictions, at larger angles, are set when even beams lie outside the area of the fixed retroreflector 6 or when odd beams lie outside the area of the movable retroreflector 10. In this embodiment, the range is also restricted to angles for which beam of graph 56 lies within the area of the movable retroreflector 6 but outside that of the fixed retroreflector 6.

Similar representations of the dynamic behaviour of the beam pattern within a beam pathlength multiplier 1 or 2 can be made for any reflector configuration, greatly facilitating the design of the optical system.

The calibration equation for the optical system is obtained by evaluating the quantity K in equation (10). If the number of reflections in each beam pathlength multiplier 1 or 2 is designated P, and the number of fringes detected is N, then K = λN/2P where λ is the wavelength of the laser transition (632.816 nm for the He/Ne visible transition). Equation (10) may now be written $$\sin\beta - \sin\alpha = \lambda N/2PD. \qquad (18)$$

In the embodiment shown in FIG. 1, P was arbitrarily set equal to 6. With the insertion of numerical values, including the value for D given above as 19.02592, (18) becomes $$\sin\beta - \sin\alpha = 2.771\ 727 \times 10^{-7} N. \qquad (19)$$

Equation (19) establishes the instrumental resolution as 57 milliseconds of arc per fringe.

The assembly on the rotatable, mounting means 14 was mounted on a rotary table and the optical system aligned as described above. Set end points of an unknown angle were established by sensitive electromechanical transducers. The table was rotated between the end points and a fringe count recorded; this was repeated many times to generate a satisfactory statistical base for the measurement.

As an example, the fringe count for 25 trials in such an experiment was found to have a mean value of 82 108 fringes. The probable error of this value was 0.33 fringes, while the maximum deviation from the mean was 4 fringes. The computed angle was 1° 14 ft. 14.527 in. ± 0.161 inch. The uncertainty in the computed angle includes the uncertainties in $\lambda$, N and D as well as $\alpha$, and therefore represents the accuracy of the measured angle, as opposed to the precision (0.057 inch).

Trials of this type were carried out without shielding of any kind. Due to its compactness, the optical system according to the present invention thermalizes very rapidly.

The optical system according to the present invention offers several distinct advantages over existing instruments in the measurement of angles with high precision and accuracy. Because of the unique inversion properties of dihedral retroreflectors, embodiments of the present invention allow a very direct angular determination on the basis of a single precision length measurement.

Due to the double-pass technique, the centre of rotation 0 may be situated anywhere, even completely outside the dimensions of the optical system.

Since beam pathlength multiplication is employed, precise measurements may be made using the simple logic of pulse-counting, without resorting to fringe interpolation. This technique has also allowed the optical system according to the present invention to be compactly constructed so that thermal, atmospheric and mechanical perturbations are minimized. The optical system need not be shielded in any but the most hostile environments.

It multilayer dielectric coatings are used in place of the simple aluminization of the prototype, a gain in precision may be achieved by using beam pathlength multipliers 1 and 2 with a larger number of reflections. This gain will, however, be at the expense of instrumental range and perhaps the necessity of active thermal and atmospheric stabilization.

If a polarizing beam splitter is used for the beam splitter 24, then a commercial laser ranging interferometer may be used as the complete source/detector unit.

In another embodiment, the movable set of retroreflectors 8 and 10 have been fabricated together as a monolithic structure of fused silica. This method of construction offers secular and environmental stability and the mounting means 14 integral with the structure. In this form, the invention may assume the role of a standard of angular measurement, and the ridge separation, D, may be determined to an accuracy of a factor of two better than that obtained for the embodiment previously discussed.

Further in this embodiment, the fixed retroreflectors 4 and 6 have been fabricated each of a monolithic piece of fused silica. The beamsplitter of retroreflector 4 has been made of a cemented-prism multi-layer dielectric polarizing beamsplitter. This construction eliminates refraction of beam 30 in passing through the beamsplitter substrate, obviating the need for a refraction compensator, 36, adjacent the retroreflector 6 and enabling the use of commercially available laser source and detector units in conjunction with the present invention.

In this embodiment, fixed retroreflector 6 has also been fabricated of a monolithic piece of fused silica, and refraction compensator 36 has been omitted, increasing the beam intensity and fringe contrast by over 50 percent.

In other embodiment of the present invention, the laser beam is replaced by other forms of electromagnetic energy such as, for example, a light beam from an atomic fluorescence or microwave energy.

I claim:

1. An optical system for angle measurement by interfomety comprising:

a. two, similar beam pathlength multipliers each consisting of a fixed retroreflector and a movable retroreflector in the reflecting path of the corresponding fixed retroreflector to form the beam pathlength multiplier therewith, b. fixed mounting means mounting both of the fixed retroreflectors with their inversion planes in a common plane which is normal to beams to be reflected back and forth between each fixed retroreflector and the corresponding movable retroreflector, c. rotatable mounting means mounting both of the movable retroreflectors for rotation together about a single axis at right angles the said beams, and with the movable retroreflectors at a predetermined distance apart, d. a beam splitter adjacent a first one of the fixed, retroreflectors, for splitting a primary beam of electromagnetic energy, from a source thereof, into two secondary beams, and directing one secondary beam into the reflecting path of the beam pathlength multiplier containing the said first fixed retroreflector, and the other secondary beam in front of the reflecting faces of a second one of the fixed retroreflectors, e. a beam folder adjacent the said second, fixed retroreflectors for reflecting the said other secondary beam to beam pathlength multiplier consisting of the said second, fixed retroreflector and the corresponding movable, retroreflector thereto, f. two retroreflectors each adjacent one of the fixed retroreflectors, and each for reflecting one of the said secondary beams back along paths between the adjacent, fixed retroreflector and the corresponding movable retroreflector towards the beamsplitter where interference between the secondary beams will occur, forming patterns of fringes, whereby, g. when a primary beam of electromagnetic energy is directed from a source thereof to the beam splitter, angular displacements of the rotatable mounting means about said axis of rotation can be deduced from the pre-determined distance that the ridges of the movable retroreflectors are apart and a count of the number of fringes generated at the beam splitter by rotation of the rotatable mounting means.

2. An optical system according to claim 1, wherein the fixed retroreflectors and the movable retroreflectors are dyhedral reflectors.

3. An optical system according to claim 2, wherein the dihedral reflectors each comprise an aluminized silica element which has been polished flat.

4. An optical system according to claim 3, wherein the beam splitter is integral with an end portion of one, fixed reflector.

* * * * *